United States Patent
Chew

(10) Patent No.: US 9,542,356 B2
(45) Date of Patent: Jan. 10, 2017

(54) DETERMINING, AT LEAST IN PART, ONE OR MORE RESPECTIVE AMOUNTS OF BUFFER MEMORY

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 13/995,221

(22) PCT Filed: Aug. 25, 2011

(86) PCT No.: PCT/US2011/049209
§ 371 (c)(1),
(2), (4) Date: Jun. 18, 2013

(87) PCT Pub. No.: WO2013/028203
PCT Pub. Date: Feb. 28, 2013

(65) Prior Publication Data
US 2013/0268618 A1    Oct. 10, 2013

(51) Int. Cl.
*G06F 15/167*    (2006.01)
*H04L 12/935*    (2013.01)
(Continued)

(52) U.S. Cl.
CPC ......... *G06F 15/167* (2013.01); *H04L 49/3054* (2013.01); *H04L 49/9005* (2013.01); *H04L 69/24* (2013.01)

(58) Field of Classification Search
CPC ...... H04L 12/56; H04L 49/10; H04L 49/3054; H04L 49/9005; H04L 69/24; H04L 12/10; H04L 45/00; H04W 52/0206; G06F 1/3203
(Continued)

(56) References Cited

U.S. PATENT DOCUMENTS 6,397,287 B1    5/2002    Brown
6,708,278 B2    3/2004    Howard et al.
(Continued)

FOREIGN PATENT DOCUMENTS

WO    2013/028203 A1    2/2013

OTHER PUBLICATIONS

Extended European Search Report for EP application 11871253.8, mailed on Jan. 14, 2015, 3 pages.
(Continued)

*Primary Examiner* — Dustin Nguyen
(74) *Attorney, Agent, or Firm* — Christopher K. Gagne

(57) ABSTRACT

An embodiment may include determining at least one respective amount of buffer memory to be used to store at least one respective portion of network traffic. The determining may be based at least in part upon at least one respective parameter associated with the at least one respective network traffic portion. The at least one respective amount may be sufficient to store the at least one respective portion of the network traffic. The at least one respective parameter may reflect at least one actual characteristic of the at least one respective portion of the network traffic. This embodiment also may permit at least one respective portion of the buffer memory that may correspond to the at least one respective amount to be selectively powered-on to permit the at least one portion of the buffer memory to be used to store the at least one respective network traffic portion.

16 Claims, 3 Drawing Sheets

(51) Int. Cl.
*H04L 29/06* (2006.01)
*H04L 12/861* (2013.01)

(58) Field of Classification Search
USPC ......... 370/306, 401, 351; 711/147; 709/233, 709/213; 713/300, 323
See application file for complete search history.

(56) References Cited

U.S. PATENT DOCUMENTS

| | | | |
|---|---|---|---|
| 6,993,667 B1* | 1/2006 | Lo | H04L 12/12 370/287 |
| 7,069,373 B2 | 6/2006 | Teng | |
| 7,167,934 B1 | 1/2007 | Dunn et al. | |
| 7,210,619 B2 | 5/2007 | Wurzburg | |
| 7,606,951 B2 | 10/2009 | Woodbridge | |
| 7,774,521 B2 | 8/2010 | Gupta et al. | |
| 7,840,733 B2 | 11/2010 | Por et al. | |
| 7,991,921 B2 | 8/2011 | Fischer | |
| 8,001,296 B2 | 8/2011 | Saito | |
| 8,078,893 B2 | 12/2011 | Umedu | |
| 8,200,853 B2 | 6/2012 | Aull et al. | |
| 8,234,421 B2 | 7/2012 | Leaming | |
| 8,281,171 B2 | 10/2012 | Tang | |
| 8,631,255 B2 | 1/2014 | Chew | |
| 2001/0050913 A1* | 12/2001 | Chen et al. | 370/360 |
| 2003/0110283 A1* | 6/2003 | Lee | H04L 69/24 709/233 |
| 2004/0078608 A1* | 4/2004 | Kanapathippillai et al. | 713/300 |
| 2006/0035527 A1 | 2/2006 | Numano | |
| 2006/0265608 A1* | 11/2006 | Fung | G06F 1/3203 713/300 |
| 2008/0005445 A1 | 1/2008 | Diefenbaugh et al. | |
| 2009/0138732 A1 | 5/2009 | Chang | |
| 2010/0005204 A1 | 1/2010 | Por et al. | |
| 2010/0005327 A1 | 1/2010 | Murata | |
| 2010/0241889 A1 | 9/2010 | Fu et al. | |
| 2011/0058564 A1* | 3/2011 | Sugawara et al. | 370/401 |
| 2011/0099305 A1 | 4/2011 | Dai et al. | |
| 2011/0173429 A1 | 7/2011 | Hollis | |
| 2011/0231682 A1 | 9/2011 | Kakish et al. | |
| 2012/0066531 A1* | 3/2012 | Shafai | H04W 52/0206 713/323 |
| 2013/0003746 A1* | 1/2013 | Klein | H04L 12/10 370/401 |
| 2013/0070754 A1* | 3/2013 | Iovanna | H04L 45/00 370/351 |

OTHER PUBLICATIONS

International Search Report and Written Opinion received for PCT Patent Application No. PCT/US2011/049209, mailed on Apr. 10, 2012, 9 pages.
Final Office Action received for U.S. Appl. No. 12/910,338 mailed on May 14, 2013, 10 pages.
Non Final Office Action received for U.S. Appl. No. 12/910,338 mailed on Dec. 6, 2012, 11 pages.
Response to Final Office Action received for U.S. Appl. No. 12/910,338, filed Sep. 13, 2013, 9 pages.
Response to Non Final Office Action received for U.S. Appl. No. 12/910,338, filed Mar. 6, 2013, 11 pages.
International Preliminary Report on Patentability with Written Opinion received for PCT Patent Application No. PCT/US2011/049209, mailed on Feb. 25, 2014, 5 pages.
Communication Pursuant to Rules 70(2) and 70a(2) EPC for EP application 11871253.8, dated Jan. 30, 2015, 1 page.
International Search Report and Written Opinion received in PCT application No. PCT/US2011/049209, dated Apr. 10, 2012.
Office Action (and related search report) received in Chinese Patent Application No. 201180073048.X, dated Oct. 26, 2015 (9 pages).
Office Action received in Chinese Patent Application No. 201180073048.X, dated Jun. 14, 2016 (7 pages).
Decision of Rejection received in Chinese Patent Application No. 201180073048.X, dated Nov. 2, 2016 (7 pages).

* cited by examiner

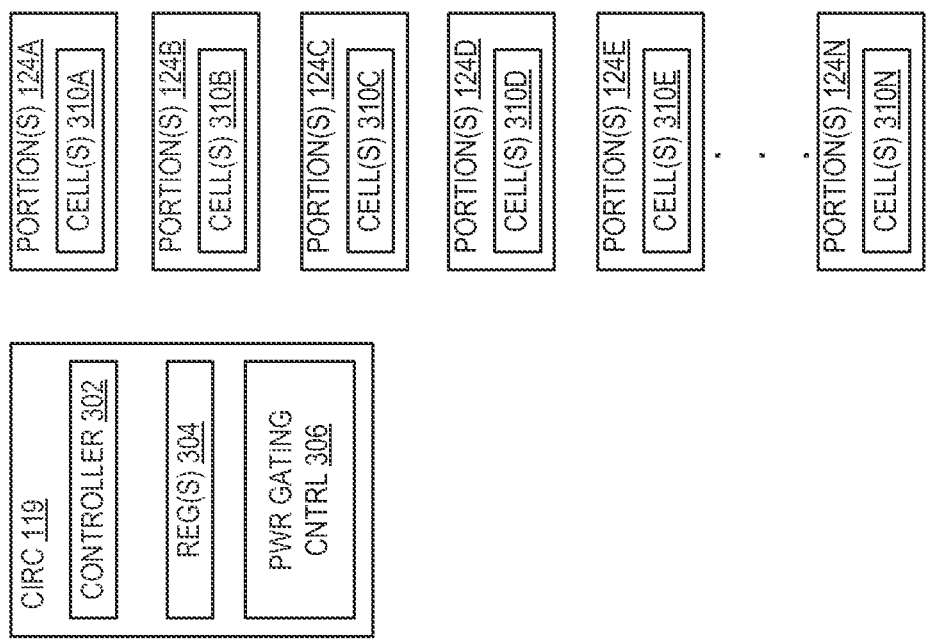

DETERMINING, AT LEAST IN PART, ONE OR MORE RESPECTIVE AMOUNTS OF BUFFER MEMORY

This disclosure relates to determining, at least in part, one or more respective amounts of buffer memory.

BACKGROUND

In one conventional network arrangement, before beginning a communication session, a first host and a second host negotiate the parameters of that session. Each of the hosts establishes respective local buffers (i.e., respectively local to each of the respective hosts) to store packets involved in the session. Typically, the respective sizes of the respective local buffers are established, independent of the actual parameters of the session, so as to conform to the maximum buffering requirements (i.e., in order to prevent buffer overflow) that may be expected to prevail in a worse case communication scenario during the session. This may result in more buffer memory being allocated and powered on for packet storage than is actually used to store the packets. This may make buffer memory usage and/or allocation less efficient, and also may increase energy consumption.

Features and advantages of embodiments will become apparent as the following Detailed Description proceeds, and upon reference to the Drawings, wherein like numerals depict like parts, and in which:

FIG. 3 illustrates features in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
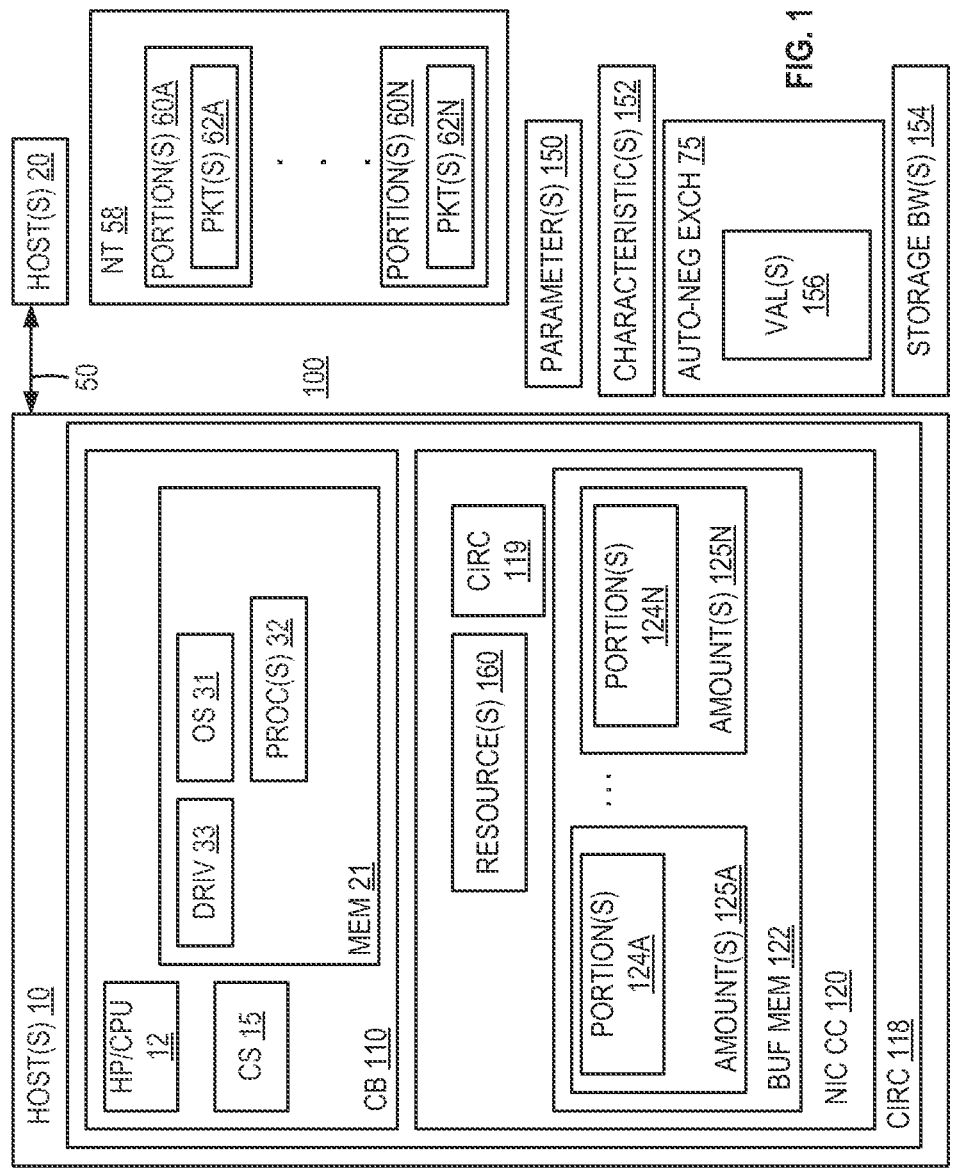
FIG. 1 illustrates a system embodiment.

FIG. 1 illustrates a system embodiment 100. System 100 may include one or more hosts 10 that may be communicatively coupled, via one or more networks and/or links 50, to one or more other hosts 20. In this embodiment, one or more hosts 10 and one or more hosts 20 may be geographically remote from each other. In an embodiment, the terms "host computer," "host," "server," "client," "network node," "end station," "end node," "intermediate node," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof.

In this embodiment, a "network" or "link" may be or comprise any mechanism, instrumentality, modality, and/or portion thereof that may permit, facilitate, and/or allow, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data, and information may be used interchangeably, and may be or comprise one or more commands (for example one or more program instructions), and/or one or more such commands may be or comprise data and/or information. Also in this embodiment, an "instruction" may include data and/or one or more commands. Although the one or more hosts 10 and/or 20, and/or one or more networks and/or links 50 (and/or other components of system 100 described herein) may be referred to in the singular, it should be understood that each such respective component may comprise a plurality of such respective components without departing from this embodiment.

In this embodiment, one or more hosts 20 may comprise respective components that may be identical or substantially similar, at least in part, in their respective constructions, operations, and/or capabilities to the respective construction, operation, and/or capabilities (e.g., described herein) of the respective components of one or more hosts 10. Of course, alternatively, without departing from this embodiment, the respective constructions, operations, and/or capabilities of one or more hosts 20 (and/or one or more components thereof) may differ, at least in part, from the respective construction, operation, and/or capabilities of one or more hosts 10 (and/or one or more components thereof).

One or more hosts 10 may comprise circuitry 118. Circuitry 118 may comprise, for example, one or more circuit boards (CB) 110 and/or one or more network interface controllers (NIC) circuit cards (CC) 120. In this embodiment, CB 110 may be or comprise one or more system motherboards that may comprise one or more single and/or multi-core host processors (HP)/central processing units (CPU) 12, one or more chipsets (CS) 15, and/or computer-readable/writable host system memory 21. The one or more CB 110 may be capable of being physically, electrically, and/or communicatively coupled to the one or more NIC CC 120 via one or more not shown bus connector/slot systems. When so coupled, one or more CB 110, HP 12, CS 15, and/or memory 21 may become communicatively coupled to one or more CC 120 and/or to one or more components of one or more CC 120. For example, one or more CS 15 may comprise, e.g., memory, input/output controller circuitry, and/or network interface controller circuitry. When so coupled, one or more host processors 12 may be communicatively coupled via the one or more CS 15 to memory 21 and/or the one or more NIC CC 120.

One or more NIC CC 120 may comprise, at least in part, one or more circuitry 119, one or more resources 160, and/or buffer memory 122. In this embodiment, one or more resources 160 may be or comprise, for example, packet encryption and/or decryption circuitry that may be other than (e.g., distinct from and/or in addition to, at least in part) buffer memory 122 and/or one or more portions of buffer memory 122. Of course, without departing from this embodiment, one or more resources 160 may be or comprise, at least in part, one or more other and/or additional types of resources, and/or may be comprised, at least in part, in buffer memory 122 and/or one or more portions of buffer memory 122. In this embodiment, in addition or as an alternative to what is shown in the Figures, some or all of one or more NIC CC 120, and/or the functionality and components thereof, may be comprised in, for example, one or more host processors 12, one or more CS 15, and/or CB 110.

In this embodiment, one or more operating systems (OS) 31, one or more drivers 33, and/or one or more (e.g., user and/or application-level) processes 32 may be executed, at least in part, by one or more host processors 12, circuitry 119, one or more resources 160, and/or NIC CC 120 in host 10. When so executed, one or more OS 31, one or more drivers 33, and/or one or more processes 32 may become resident, at least in part, in memory 21.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a host processor, processor, processor core, core, and/or controller each may comprise respective circuitry capable of performing, at least in part, one or more arithmetic and/or logical operations, such as, for example, one or more respective central processing units. Although not shown in the Figures, each of the hosts 10 and/or 20 may comprise a respective graphical user interface system. The not shown graphical user interface systems each may comprise, e.g., a respective keyboard, pointing device, and display system that may permit a human user to input commands to, and monitor the operation of, one or more hosts 10 and/or 20, and/or system 100.

Memory 21 and/or buffer memory 122 may comprise one or more of the following types of memories: semiconductor firmware memory, programmable memory, non-volatile memory, read only memory, electrically programmable memory, random access memory, flash memory, magnetic disk memory, phase-change memory, optical disk memory, and/or other or later-developed computer-readable and/or writable memory. Accordingly, although in this embodiment, buffer memory 122 may comprise static random access memory, buffer memory 122 may comprise other and/or additional types and/or configurations of memory (e.g., other than and/or in addition to that which is described herein) without departing from this embodiment.

One or more machine-readable program instructions may be stored in memory 21, one or more host processors 12, one or more CS 15, one or more NIC CC 120, one or more resources 160, circuitry 119, and/or circuitry 118. In operation, these instructions may be accessed and executed by one or more host processors 12, one or more CS 15, one or more NIC CC 120, one or more resources 160, circuitry 119, and/or circuitry 118. When so accessed executed, these one or more instructions may result in these components of system 100 performing operations described herein as being performed by these components of system 100.

In this embodiment, a portion, subset, or fragment of an entity may comprise all of, more than, or less than the entity. Additionally, in this embodiment, a value may be "predetermined" if the value, at least in part, and/or one or more algorithms, operations, and/or processes involved, at least in part, in generating and/or producing the value is predetermined, at least in part. Also, in this embodiment, a process, thread, daemon, program, driver, virtual machine, virtual machine monitor, operating system, application, and/or kernel each may (1) comprise, at least in part, and/or (2) result, at least in part, in and/or from, execution of one or more operations and/or program instructions. In this embodiment, a resource may be, involve, specify, and/or comprise one or more physical, logical, and/or virtual (1) capabilities, functions, and/or operations, (2) portions of circuitry, (3) processes, and/or (4) capabilities, functions, and/or operations that may result from, be used by, and/or be implementable using one or more such portions of circuitry, and/or processes.

In this embodiment, hosts 10 and 20 may exchange data and/or commands via network 50 in accordance with one or more protocols. In this embodiment, these one or more protocols may be compatible with, e.g., one or more Ethernet and/or Transmission Control Protocol/Internet Protocol (TCP/IP) protocols.

For example, one or more Ethernet protocols that may be utilized in system 100 may comply or be compatible with, at least in part, IEEE Std. 802.3-2008 (including for example Annex 31B entitled "MAC Control Pause Operation"), Dec. 26, 2008; IEEE Std. 802.1Q-2005, May 19, 2006; IEEE Draft Standard P802.1Qau/D2.5, Dec. 18, 2009; IEEE Draft Standard P802.1Qaz/D1.2, Mar. 1, 2010; IEEE Draft Standard P802.1Qbb/D1.3, Feb. 10, 2010; and/or, IEEE P802.1Qat/D6.0, Draft Standard for Local and Metropolitan Area Networks—Virtual Bridged Local Area Networks—Amendment 9: Stream Reservation Protocol (SRP), Apr. 23, 2010 (hereinafter "SRP"). The TCP/IP protocol that may be utilized in system 100 may comply or be compatible with, at least in part, the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

After, for example, a reset or other event of or in one or more hosts 10, one or more hosts 20, system 100, and/or communication via one or more links 50, etc., one or more hosts 10 and/or 20 may exchange between or among themselves one or more auto-negotiation exchanges 75, for example, in accordance with one or more auto-negotiation techniques that comply and/or are in accordance with, at least in part, the one or more above-described protocols. These one or more exchanges 75 may be for the purpose of facilitating and/or establishing communication involving, at least in part, hosts 10 and/or 20 that may comply and/or be compatible with, at least in part, the one or more above-describe protocols. For example, these one or more exchanges 75 may comprise, at least in part, one or more values 156. These one or more values 156 may indicate, reflect, embody, specify, and/or determine, at least in part, one or more actual characteristics (symbolically illustrated by one or more actual characteristics 152) of one or more respective portions (e.g., in this embodiment, a plurality of respective portions 60A . . . 60N) of network traffic (NT) 58 that is to take place (e.g., as a result, at least in part, of the auto-negotiation between or among the hosts 10 and/or 20) between or among hosts 10 and/or 20. In this embodiment, network traffic 58 and/or one or more respective portions 60A . . . 60N of network traffic 58 may be or comprise, at least in part, one or more packets. For example, as shown in FIG. 1, one or more respective portions 60A of network traffic 58 may comprise, at least in part, one or more packets 62A to be transmitted from host 10 to host 20, and/or one or more portions 60N may comprise, at least in part, one or more packets 62N to be received by host 10 from host 20. In this embodiment, a packet may comprise one or more symbols and/or values.

In this embodiment, one or more drivers 33 may control, at least in part, operation of circuitry 119 and/or circuitry 118. For example, the execution of one or more drivers 33 in host 10 may result in circuitry 119 and/or 118 determining, at least in part, one or more respective amounts 125A . . . 125N of buffer memory 122 that are to be used, at least in part, to store (at least temporarily and/or at least in part)

the one or more respective portions 60A . . . 60N of the network traffic 58. Circuitry 119 and/or 118 may make this determination prior to, at least in part, the commencement of the transmission and/or reception of the network traffic 58 and/or one or more respective portions 60A . . . 60N of the network traffic 58. For example, in this embodiment, circuitry 119 and/or 118 may make this determination, at least in part, of these one or more respective amounts 125A . . . 125N of buffer memory 122 based at least in part upon one or more respective parameters (symbolically illustrated by one or more respective parameters 150). These one or more respective parameters 150 may be associated, at least in part, with the one or more respective portions 60A . . . 60N of the network traffic 58 that are to be stored in the one or more respective amounts 125A . . . 125N of buffer memory 122. For example, these one or more respective amounts 125A . . . 125N of buffer memory 122 may be sufficient to store one or more expected (e.g., respective) storage bandwidths (symbolically illustrated by one or more expected storage bandwidths (BW) 154) of the one or more respective portions 60A . . . 60N of the network traffic 58.

In this embodiment, an amount of memory may be, comprise, specify, indicate, implicate, and/or relate to, at least in part, one or more contiguous and/or non-contiguous addresses, storage locations, portions, lines, and/or storage sizes (e.g., bytes) of and/or in that memory. Also in this embodiment, storage bandwidth may be, comprise, specify, indicate, implicate, and/or relate to, at least in part, (1) one or more amounts of memory, and/or (2) one or more latency and/or other characteristics implicated by and/or involved with accessing the memory. In this embodiment, accessing memory may comprise, at least in part, reading of and/or writing to the memory.

Also in this embodiment, the execution of one or more drivers 33 in host 10 may result in circuitry 119 and/or 118 permitting, at least in part, one or more respective portions 124A . . . 124N of buffer memory 122 to be selectively powered-on to permit the one or more respective portions 124A . . . 124N to be used, at least in part, to store the one or more respective portions 60A . . . 60N of the network traffic 58. These one or more respective portions 124A . . . 124N of buffer memory 122 may correspond, at least in part, to the one or more respective amounts 125A . . . 125N of buffer memory 122. For example, one or more respective portions 124A . . . 124N of buffer memory 122 may be equivalent to, equal in size to, and/or comprise, at least in part, one or more respective portions 125A . . . 125N of buffer memory 122.

In this embodiment, the one or more parameters 150 may be generated by circuitry 119 and/or 118 (e.g., as a result at least in part of the execution of one or more drivers 33 in host 10) based upon, comprise, and/or reflect, at least in part, the one or more actual characteristics 152 and/or one or more values 156. The one or more actual characteristics 152 may be determined, at least in part (e.g., by circuitry 119, circuitry 118, and/or one or more drivers 33), as a result, at least in part, of the auto-negotiation between or among the hosts 10 and/or 20. For example, this determination by circuitry 119, circuitry 118, and/or one or more drivers 33 may be based upon, at least in part, for example, the one or more values 156.

Figure 2:
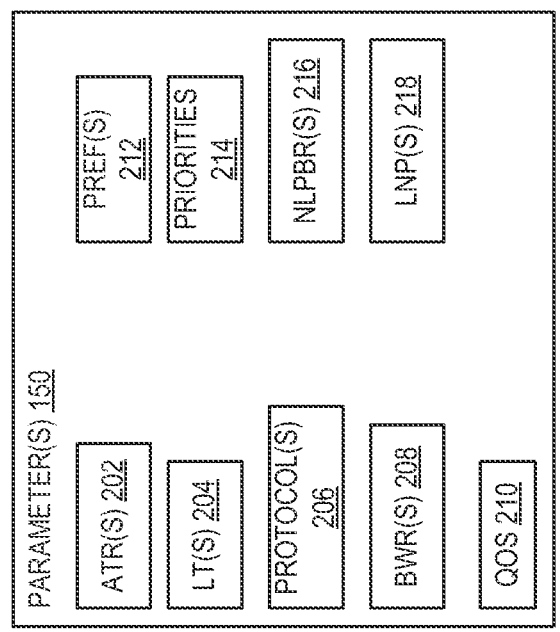
FIG. 2 illustrates features in an embodiment.

One or more parameters 150 may comply, may be according to, may be compatible with, and/or may be determined and/or established in accordance with, at least in part, the one or more above-described protocols and/or the auto-negotiation. One or more parameters 150 may comprise, at least in part, as shown in FIG. 2: (1) one or more respective actual transmission rates (ATR) 202 of the one or more respective portions 60A . . . 60N of network traffic 58, (2) one or more respective link types (LT, e.g., of the one or more links 50) 204 associated with, at least in part, the transmission of the one or more respective portions 60A . . . 60N (e.g., via which the respective portions 60A . . . 60N are to be transmitted), (3) one or more respective protocols 206 associated with, at least in part, the one or more respective portions 60A . . . 60N (e.g., with which the respective portions 60A . . . 60N comply and/or are compatible), (4) one or more respective bandwidth reservations (BWR) 208 associated at least in part with the one or more respective portions 60A . . . 60N (e.g., one or more respective bandwidth reservations allocated to the one or more respective portions 60A . . . 60N in accordance with SRP), (5) one or more respective quality of service (QOS) 210 requirements associated at least in part with the one or more respective portions 60A . . . 60N, (6) one or more priorities 214 of and/or associated with, at least in part, one or more respective portions 60A . . . 60N, (7) one or more network layer protocol bandwidth requirements (NLPBR) 216 of and/or associated with, at least in part, one or more respective portions 60A . . . 60N, and/or (8) one or more respective link negotiation parameters (LNP) 218 of the one or more respective links 50 used to transmit and/or receive the one or more portions 60A . . . 60N. Additionally or alternatively, one or more parameters 150 may comprise one or more respective user preferences 212 that may be defined and/or input by a human user via, e.g., the not shown user interface of host 10 and/or one or more application-level processes 32. These one or more preferences 212 may adjust, modify, and/or specify, at least in part, one or more of the foregoing (and/or other) parameters 150. For example, one or more preferences 212 may indicate, at least in part, one or more maximum supported packet sizes (e.g., of one or more packets 62A . . . 62N), one or more upper protocol layer packet sizes, and/or transmission/reception bandwidth requirements associated with portions 60A . . . 60N and/or traffic 58. Of course, the foregoing is merely exemplary, and many additions, modifications, and/or variations thereof are possible without departing from this embodiment. In this embodiment, one or more parameters 150 may be determined, at least in part, by circuitry 119, circuitry 118, and/or one or more drivers 33 prior to and/or contemporaneous with, at least in part, commencement of transmission of one or more portions 60A . . . 60N and/or network traffic 58 via one or more links 50.

Circuitry 119, circuitry 118, and/or one or more drivers 33 may allocate, at least in part, one or more respective portions 124A . . . 124N of buffer memory 122 to store the one or more respective portions 60A . . . 60N, based at least in part upon the one or more respective parameters 150. For example, circuitry 119, circuitry 118, and/or one or more drivers 33 may determine, based at least in part, upon these one or more parameters 150, one or more respective expected storage bandwidths 154 of the one or more respective portions 60A . . . 60N. Based at least in part upon these one or more expected respective bandwidths 154, circuitry 119, circuitry 119, and/or one or more drivers 33 may determine, at least in part, one or more respective amounts 125A . . . 125N of buffer memory 122 that may be minimally sufficient to satisfy these one or more respective bandwidths 154 and/or to store the one or more portions 60A . . . 60N of network traffic 58. In this embodiment, the minimally sufficient amount of buffer memory may be calculated so as not to exceed what is minimally required to so satisfy these one or more bandwidths 154 and/or to so store these one or more portions 60A . . . 60N in one or more not shown queues without suffering meaningful queue/buffer overflow and/or packet dropping due to insufficient buffering. Circuitry 119, circuitry 118, and/or one or more drivers 33 may allocate, at least in part, one or more respective portions 124A, 124B, 124C . . . 124N (see FIG. 3) of the buffer memory 122 in such a way as to ensure that these one or more allocated portions of the buffer memory 122 correspond to these one or more respective minimally required amounts 125A . . . 125N of buffer memory 122.

For example, as shown in FIG. 3, circuitry 119 may comprise controller 302, one or more control registers 304, and/or buffer memory power gating control circuitry 306. The execution of one or more drivers 33 may result, at least in part, in one or more registers 304 being programmed with one or more values that may reflect, specify, and/or indicate, at least in part, these one or more respective minimally required amounts 125A . . . 125N of buffer memory 122. Based at least in part upon the one or more values that may be programmed into one or more registers 306, controller 302 may allocate, at least in part, one or more respective portions 124A, 124B, 124C . . . 124N of buffer memory 122 that may correspond to these one or more respective minimally required amounts 125A . . . 125N of buffer memory 122.

For example, as shown in FIG. 3, buffer memory 122 may be partitioned into a plurality of portions 124A, 124B, 124C, 124D, 124E . . . 124N. Each of these portions 124A, 124B, 124C, 124D, 124E . . . 124N may comprise one or more respective equally-sized memory cell blocks 310A, 310B, 310C, 310C, 310D, 310E . . . 310N. For example, each of the respective portions 124A, 124B, 124C, 124D, 124E . . . 124N and/or each of the respective cell blocks 310A, 310B, 310C, 310C, 310D, 310E . . . 310N may have the same respective storage capacity. In this example, based at least in part upon one or more values 156, characteristics 152, and/or parameters 150, one or more portions 60A of network traffic 58 may be associated with one or more relatively higher bandwidth, speed, and/or priority communications and/or links. Also in this example, based at least in part upon one or more values 156, characteristics 152, and/or parameters 150, one or more portions 60N of network traffic 58 may be associated with one or more relatively lower bandwidth, speed, and/or priority communications and/or links (e.g., relative to the one or more relatively higher bandwidth, speed, and/or priority communications and/or links with which one or more portions 60A may be associated). In response to and/or based at least in part upon the one or more values stored in one or more registers 304, controller 302 may allocate respective sets of portions 124A . . . 124N that may reflect, correspond to, and/or take into the respective relative differences in respective bandwidths, speeds, and/or priorities of the communications and/or links associated with respective portions 60A and 60N. For example, depending upon these respective relative differences in respective bandwidths, speeds, and/or priorities, controller 302 may allocate four or more respective portions (e.g., portions 124A, 124B, 124C, and 124D) of buffer memory 122 to store (e.g., at least temporarily and/or at least in part) one or more portions 60A, but controller 302 may allocate one or more respective portions (e.g., one or more portions 124E) of buffer memory 122 to store (e.g., at least temporarily and/or at least in part) one or more portions 60N. In this example, one or more portions (e.g., one or more portions 124N) may not be necessary to store any portion of traffic 58, and accordingly, controller 302 may not allocate any portion of the traffic 58 for storage in these one or more portions 124N. Controller 302 may track these allocations (e.g., via suitable buffer memory address pointers, etc.) by storing appropriate values in, for example, one or more registers 304. These values may be used by circuitry 118, NIC CC 120, one or more drivers 33, HP 12, CS 15, and/or other components to access the allocated portions of buffer memory 122 for storage and/or retrieval of the one or more portions 60A . . . 60N of network traffic 58.

Based at least in part upon the one or more values stored in one or more registers 304, controller 302 may supply control signals to power gating control circuitry 306 that may result in circuitry 306 permitting actuating electrical power to be supplied to the portions 124A, 124B, 124C, 124D, and 124E of buffer memory 122 that may be allocated to store portions 60A, 60N of traffic 58. These control signals also may result in circuitry 306 not permitting actuating electrical power to be supplied to any portion (e.g., one or more portions 124N) of buffer memory 122 that may not be allocated to store any portion of traffic 58. This may permit the portions 124A, 124B, 124C, 124D, and 124E of buffer memory 122 that may be allocated to store portions 60A, 60N of traffic 58 to be selectively powered-on (e.g., based at least in part upon the one or more values stored in one or more registers 304) to permit these portions 124A, 124B, 124C, 124D, and 124E of buffer memory 122 to be used, at least in part, to store portions 60A, 60N of traffic 58. This may also permit any portion 124N of buffer memory 122 that is not needed to store any portion of traffic 58 to be selectively power-off (e.g., also based at least in part upon the one or more values stored in one or more registers 304).

One or more drivers 33, circuitry 119, and/or circuitry 118 also may determine, at least in part, whether one or more resources 160 are to be used in connection with processing one or more portions 60A . . . 60N of traffic 58 and/or traffic 58. For example, if traffic 58 is not encrypted, then one or more resources 160 may not be needed for processing of traffic 58. Accordingly, in this case, the execution of one or more drivers 33 may result, at least in part, in one or more registers 304 being programmed with one or more values that may reflect this determination. Based at least in part upon these one or more values, controller 302 may supply control signals to circuitry 306 that may result, at least in part, in circuitry 306 not permitting actuating electrical power to be supplied to one or more resources 160. This may result in one or more resources 160 being selectively powered-off.

Conversely, if one or more drivers 33, circuitry 119, and/or circuitry 118 determine that one or more resources 160 are to be used in connection with processing traffic 58, the one or more values stored in one or more registers 304 may result in controller 302 supplying to circuitry 306 control signals that may result, at least in part, in circuitry 306 permitting actuating electrical power to be supplied to one or more resources 160. This may result in one or more resources 160 being selectively powered-on.

After an initial allocation of portions 124A . . . 124N by controller 302, one or more changes in one or more portions (e.g., one or more portions 60N) of traffic 58 may occur that may implicate, at least in part, the previous determination of the one or more respective minimally required amounts 125A . . . 125N of buffer memory 122 needed to store the one or more portions 60A . . . 60N of traffic 58. As a result, one or more parameters 150 may change to reflect this, and accordingly, the one or more values stored in one or more registers 304 may correspondingly change. This may result in controller 302 changing, at least in part, its previous allocation of the portions 124A . . . 124N of buffer memory 122 to accommodate, at least in part, the one or more changes in one or more portions 60N of network traffic 58. For example, the respective expected storage bandwidth 154 associated with one or more portions 60N of traffic 58 may increase so as to implicate one or more additional portions (e.g., one or more portions 124N) of buffer memory 122 for storage of one or more portions 60N of traffic 58. Accordingly, controller 302 may allocate two or more respective portions 124E and 124N of buffer memory 122 to store one or more portions 60N, and may supply control signals to circuitry 306 that may result, at least in part, in circuitry 306 permitting portions 124E and 124N to selectively powered-on. This may permit one or more portions 60N of network traffic 58 to be stored in portions 124E and 124N of buffer memory 122. Similar techniques may be utilized to power-off one or more portions of the buffer memory 122 if one or more changes to network traffic occur that may implicate reduction in the minimum amount of buffer memory 122 required to store the changed network traffic. One or more parameters 150 may change, at least in part, if and/or when auto-negotiation occurs again (e.g., as a result, at least in part, of being re-triggered due to, for example, changed network conditions and/or user request).

Thus, an embodiment may include circuitry that may determine, at least in part, one or more respective amounts of buffer memory to be used, at least in part, to store one or more respective portions of network traffic. The circuitry may determine, at least in part, the one or more respective amounts based at least in part upon one or more respective parameters associated, at least in part, with the one or more respective portions of the network traffic. The one or more respective amounts may be sufficient to store one or more expected storage bandwidths of the one or more respective portions of the network traffic. The one or more respective parameters may reflect, at least in part, one or more actual characteristics of the one or more respective portions of the network traffic. The circuitry may permit, at least in part, one or more respective portions of the buffer memory that correspond, at least in part, to the one or more respective amounts to be selectively powered-on to permit the one or more respective portions of the buffer memory to be used, at least in part, to store the one or more respective portions of the network traffic.

Advantageously, in this embodiment, the respective amounts and/or portions of buffer memory 122 used to store respective portions of network traffic 58 may be allocated based upon and/or in accordance with the actual parameters/characteristics of the respective portions of the network traffic, instead of conforming them to the predetermined maximum buffering requirements that might be expected to prevail in a worse case communication scenario. Advantageously, in this embodiment, this may eliminate (or substantially eliminate) the over and/or under allocation of such buffer memory, and thereby, may permit any buffer memory that is not needed for storage of the network traffic to be powered-off, without degrading performance and/or resulting in buffer/queue overflow. In this embodiment, this may make buffer memory usage and/or allocation more efficient, and also may decrease energy consumption.

Many other and/or additional modifications, variations, and/or alternatives are possible without departing from this embodiment. For example, circuitry 119 and/or buffer memory 122 may be replicated, at least in part, in each I/O port (not shown) that may be comprised in NIC CC 120, and/or for use on a network link-by-network link basis. Also, for example, although auto-negotiation techniques have been described herein as being used to gather and/or obtain one or more values 156, other techniques than those described herein may be utilized to obtain one or more values 156, one or more parameters 150, one or more storage bandwidths 154, and/or one or more characteristics 152. Additionally, in order to conserve power, after a reset of host 10, and prior to initiation of the auto-negotiation exchanges 75, the portions 124A . . . 124N of buffer memory 122 may be initialized in a powered-off state. Furthermore, the number and sizes of the portions 124A . . . 124N of buffer memory 122 may vary (e.g., depending upon expected communication parameters between or among hosts 10 and/or 20) without departing from this embodiment. Also, in this embodiment, depending upon the relative bandwidth requirements of a link's transmit buffer and its receive buffer, those buffers may share one or more respective portions of the buffer memory 122 and/or previous allocations thereof to the one or more respective portions of the buffer memory 122 may be changed, for purposes of consolidating and/or minimizing the total amount of buffer memory 122 allocated and powered-on.

Additionally or alternatively, without departing from this embodiment, one or more port sharing techniques may be employed and/or implemented, at least in part, by circuitry 118. For example, one or more send an/or receive buffers and/or queues of two or more ports may share, at least in part, one or more portions of buffer memory 122 that may be mapped and/or pooled, at least in part, to, among, and/or between such ports. Such commonly mapped, allocated, and/or pooled portions of buffer memory 122 may be allocated based at least in part upon actual and/or expected communication parameters (e.g., in accordance with this embodiment) that may be respectively associated, at least in part, with such ports. These allocated portions of buffer memory 122 may be selectively powered-on, and/or one or more non-allocated portions of buffer 122 may be selectively powered-off, based upon and/or in accordance with the foregoing teachings of this embodiment.

Many other modifications are possible. Accordingly, this embodiment should be viewed broadly as encompassing all such alternatives, modifications, and variations.

What is claimed is:

1. An apparatus comprising:
circuitry to determine, at least in part, one or more respective amounts of buffer memory to be used, at least in part, to store one or more respective portions of network traffic, the circuitry to determine, at least in part, the one or more respective amounts based at least in part upon one or more respective parameters associated, at least in part, with the one or more respective portions of the network traffic, the one or more respective amounts being sufficient to store one or more expected storage bandwidths of the one or more respective portions of the network traffic, the one or more respective parameters reflecting, at least in part, one or more actual characteristics of the one or more respective portions of the network traffic; and
the circuitry to permit, at least in part, one or more respective portions of the buffer memory that correspond, at least in part, to the one or more respective amounts to be selectively powered-on to permit the one or more respective portions of the buffer memory to be used, at least in part, to store the one or more respective portions of the network traffic;
wherein the one or more respective parameters comprise one or more network layer protocol bandwidth requirements associated at least in part with the one or more respective portions of the network traffic, and one or more respective bandwidth reservations associated at least in part with the one or more respective portions of the network traffic;

the circuitry to be replicated, at least in part, in each input/output port of the apparatus that is for use on a network link-by-network link basis;

following host reset and prior to negotiation exchange to determine, at least in part, the one or more respective parameters, the one or more respective portions of the buffer memory to be initialized in a powered-off state.

2. The apparatus of claim 1, wherein:

the one or more actual characteristics are determined, at least in part, as a result, at least in part, of auto-negotiation to facilitate communication involving a plurality of hosts, one of the plurality of hosts comprising the circuitry.

3. The apparatus of claim 1, wherein:

the circuitry is to determine, at least in part, whether one or more respective resources are to be used, at least in part, in connection with the one or more respective portions of the network traffic, the one or more respective resources being other than the one or more respective portions of the buffer memory; and the circuitry is to permit the one or more respective resources to be selectively powered-off if the circuitry determines, at least in part, that the one or more respective resources are not to be used, at least in part, with the one or more respective portions of the network traffic.

4. The apparatus of claim 1, wherein:

the one or more respective portions of the buffer memory comprise a plurality of respective portions of the buffer memory;

the one or more respective portions of the network traffic comprise a plurality of respective portions of the network traffic;

the plurality of respective portions of the buffer memory are to store, at least in part, the plurality of respective portions of the network traffic;

a circuit card comprises, at least in part, the buffer memory and the circuitry;

a host comprises a circuit board that is capable of being coupled to the circuit card; and at least one driver is to be executed in the host, the driver being to control, at least in part, operation of the circuitry.

5. The apparatus of claim 1, wherein:

the circuitry is to allocate, at least in part, the one or more respective portions of the buffer memory; and in response, at least in part, to at least one change in the one or more respective portions of the network traffic that implicates, at least in part, the one or more respective amounts, the circuitry is to change, at least in part, allocation of the one or more respective portions of the buffer memory to accommodate, at least in part, the at least one change.

6. A method comprising:

determining, at least in part, by circuitry, one or more respective amounts of buffer memory to be used, at least in part, to store one or more respective portions of network traffic, the determining, at least in part, of the one or more respective amounts being based at least in part upon one or more respective parameters associated, at least in part, with the one or more respective portions of the network traffic, the one or more respective amounts being sufficient to store one or more expected storage bandwidths of the one or more respective portions of the network traffic, the one or more respective parameters reflecting, at least in part, one or more actual characteristics of the one or more respective portions of the network traffic; and permitting, at least in part, by the circuitry, one or more respective portions of the buffer memory that correspond, at least in part, to the one or more respective amounts to be selectively powered-on to permit the one or more respective portions of the buffer memory to be used, at least in part, to store the one or more respective portions of the network traffic;

wherein the one or more respective parameters comprise one or more network layer protocol bandwidth requirements associated at least in part with the one or more respective portions of the network traffic, and one or more respective bandwidth reservations associated at least in part with the one or more respective portions of the network traffic;

the circuitry to be replicated, at least in part, in each input/output port of the apparatus that is for use on a network link-by-network link basis;

following host reset and prior to negotiation exchange to determine, at least in part, the one or more respective parameters, the one or more respective portions of the buffer memory to be initialized in a powered-off state.

7. The method of claim 6, wherein:

the one or more actual characteristics are determined, at least in part, as a result, at least in part, of auto-negotiation to facilitate communication involving a plurality of hosts, one of the plurality of hosts comprising the circuitry.

8. The method of claim 6, wherein:

the circuitry is to determine, at least in part, whether one or more respective resources are to be used, at least in part, in connection with the one or more respective portions of the network traffic, the one or more respective resources being other than the one or more respective portions of the buffer memory; and the circuitry is to permit the one or more respective resources to be selectively powered-off if the circuitry determines, at least in part, that the one or more respective resources are not to be used, at least in part, with the one or more respective portions of the network traffic.

9. The method of claim 6, wherein:

the one or more respective portions of the buffer memory comprise a plurality of respective portions of the buffer memory;

the one or more respective portions of the network traffic comprise a plurality of respective portions of the network traffic;

the plurality of respective portions of the buffer memory are to store, at least in part, the plurality of respective portions of the network traffic;

a circuit card comprises, at least in part, the buffer memory and the circuitry;

a host comprises a circuit board that is capable of being coupled to the circuit card; and at least one driver is to be executed in the host, the driver being to control, at least in part, operation of the circuitry.

10. The method of claim 6, wherein:

the circuitry is to allocate, at least in part, the one or more respective portions of the buffer memory; and in response, at least in part, to at least one change in the one or more respective portions of the network traffic that implicates, at least in part, the one or more respective amounts, the circuitry is to change, at least in part, allocation of the one or more respective portions of the buffer memory to accommodate, at least in part, the at least one change.

11. Computer-readable memory storing one or more instructions that when executed by a machine result in operations comprising:

determining, at least in part, by circuitry, one or more respective amounts of buffer memory to be used, at least in part, to store one or more respective portions of network traffic, the determining, at least in part, of the one or more respective amounts being based at least in part upon one or more respective parameters associated, at least in part, with the one or more respective portions of the network traffic, the one or more respective amounts being sufficient to store one or more expected storage bandwidths of the one or more respective portions of the network traffic, the one or more respective parameters reflecting, at least in part, one or more actual characteristics of the one or more respective portions of the network traffic; and permitting, at least in part, by the circuitry, one or more respective portions of the buffer memory that correspond, at least in part, to the one or more respective amounts to be selectively powered-on to permit the one or more respective portions of the buffer memory to be used, at least in part, to store the one or more respective portions of the network traffic;

wherein the one or more respective parameters comprise one or more network layer protocol bandwidth requirements associated at least in part with the one or more respective portions of the network traffic, and one or more respective bandwidth reservations associated at least in part with the one or more respective portions of the network traffic;

the circuitry to be replicated, at least in part, in each input/output port of the apparatus that is for use on a network link-by-network link basis;

following host reset and prior to negotiation exchange to determine, at least in part, the one or more respective parameters, the one or more respective portions of the buffer memory to be initialized in a powered-off state.

12. The computer-readable memory of claim 11, wherein:
the one or more actual characteristics are determined, at least in part, as a result, at least in part, of auto-negotiation to facilitate communication involving a plurality of hosts, one of the plurality of hosts comprising the circuitry.

13. The computer-readable memory of claim 11, wherein:
the circuitry is to determine, at least in part, whether one or more respective resources are to be used, at least in part, in connection with the one or more respective portions of the network traffic, the one or more respective resources being other than the one or more respective portions of the buffer memory; and the circuitry is to permit the one or more respective resources to be selectively powered-off if the circuitry determines, at least in part, that the one or more respective resources are not to be used, at least in part, with the one or more respective portions of the network traffic.

14. The computer-readable memory of claim 11, wherein:
the one or more respective portions of the buffer memory comprise a plurality of respective portions of the buffer memory;

the one or more respective portions of the network traffic comprise a plurality of respective portions of the network traffic;

the plurality of respective portions of the buffer memory are to store, at least in part, the plurality of respective portions of the network traffic;

a circuit card comprises, at least in part, the buffer memory and the circuitry;

a host comprises a circuit board that is capable of being coupled to the circuit card; and at least one driver is to be executed in the host, the driver being to control, at least in part, operation of the circuitry.

15. The computer-readable memory of claim 11, wherein:
the circuitry is to allocate, at least in part, the one or more respective portions of the buffer memory; and in response, at least in part, to at least one change in the one or more respective portions of the network traffic that implicates, at least in part, the one or more respective amounts, the circuitry is to change, at least in part, allocation of the one or more respective portions of the buffer memory to accommodate, at least in part, the at least one change.

16. The apparatus of claim 1, wherein:
the circuitry is to implement, at least in part, port sharing of the one or more respective portions of the buffer memory.

* * * * *